United States Patent Office 3,028,076
Patented Apr. 3, 1962

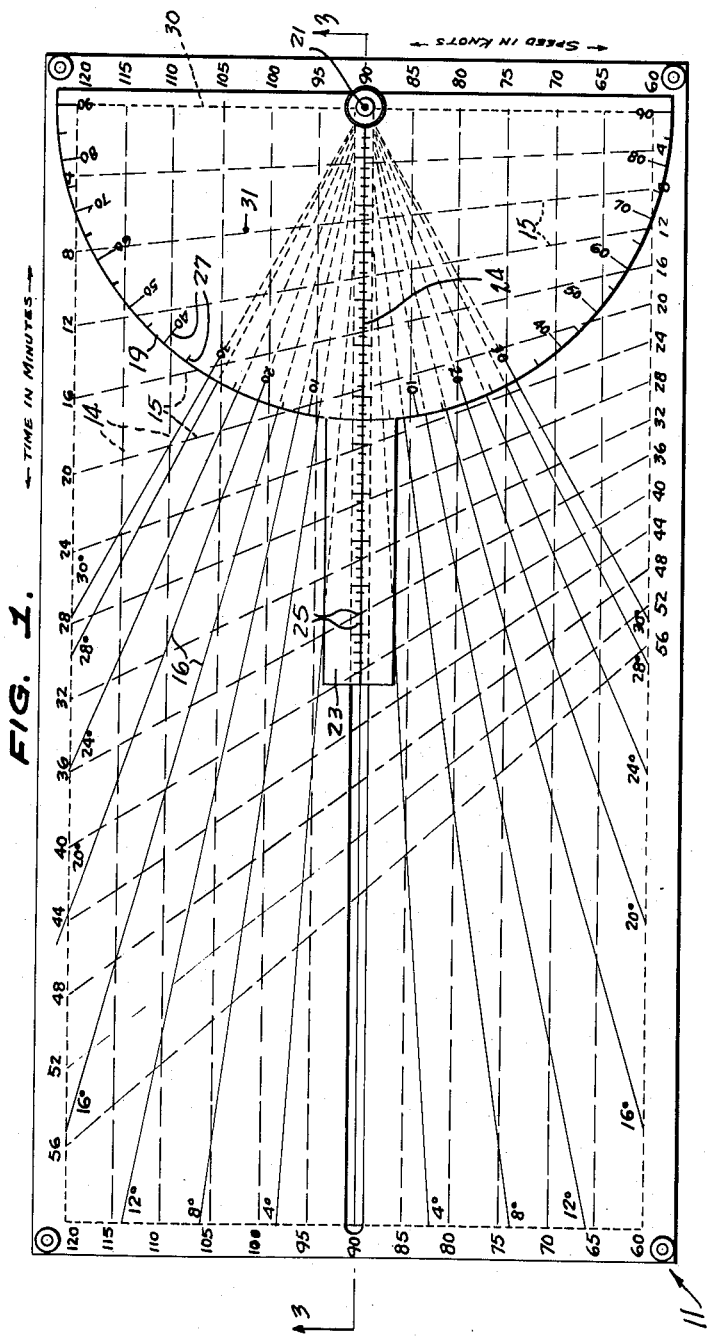

3,028,076
PILOTAGE COMPUTER
Jack W. Messmore, Inglewood, Calif. (P.O. Box 98, 76th Air Rescue Squadron, APO 953, San Francisco, Calif.)
Filed Sept. 14, 1956, Ser. No. 609,870
1 Claim. (Cl. 235—61)

This invention relates to navigational devices, and more particularly to a pilotage computer for use on aircraft.

A main object of the invention is to provide a novel and improved navigational instrument of the type adapted to be employed in conjunction with a map including a desired course of travel of an aircraft the device being adapted to provide a rapid indication of the ground speed and drift angle of an aircraft, whereby necessary course corrections may be made, and whereby estimated time of arrivals to points along the route of the aircraft may be readily obtained.

A further object of the invention is to provide an improved pilotage computer especially suitable for use on aircraft, said computer being simple in construction, being easy to operate, and being arranged to readily indicate the drift angle of an aircraft and the necessary correction angle to cause the aircraft to converge on a selected point anywhere along its intended course.

A still further object of the invention is to provide an improved pilotage computer to enable a navigator to rapidly calculate the ground speed of an aircraft and to indicate the drift angle thereof, whereby estimated time of arrival of the aircraft at various points along the route of the aircraft can be readily obtained and whereby the necessary correction may be applied to compensate for drift, the device being inexpensive to manufacture, being durable in construction, and being compact in size.

Further objects and advantages of the invention will become apparent from the following description and claim, and from the accompanying drawings, wherein:

FIGURE 1 is a top plan view of an improved pilotage computer constructed in accordance with the present invention.

FIGURE 2 is a side elevational view of the pilotage computer of FIGURE 1.

FIGURE 3 is a longitudinal vertical cross sectional view taken on line 3—3 of FIGURE 1.

Referring to the drawings, 11 generally designates a pilotage computer constructed in accordance with the present invention, said computer comprising a generally rectangular base member 12 of transparent material, such as transparent plastic material, said base member being adapted to be placed on a navigation chart, whereby the details of the chart may be viewed through said base member. The base member 12 is formed along its longitudinal center line with a slot 13 extending from adjacent one end margin of said base member to the other, as is clearly shown in FIGURE 3.

Inscribed on the base member 12 is a time-distance scale comprising a series of spaced horizontal speed lines 14 which are uniformly spaced, as shown in FIGURE 1, and a series of spaced time lines 15 crossing the speed lines 14 at relatively large angles and slanting vertically for a reason presently to be explained.

Also inscribed on the base member 12 are the drift angle lines 16 which diverge from a focal point, for example, the right end of the slot 13, as viewed in FIGURES 1 and 3, the drift angle line 16 being marked with respective drift angle values on opposite sides of the longitudinal center line of the base member 12, namely, the line along which the slot 13 is located.

As will be presently explained, in using the device, the slot 13 is aligned with and laid over the intended course of travel of the aircraft, to enable drift angle values to be ascertained from the drift angle line 16.

Designated at 17 is a second transparent plate member similar in shape to the base member 12 and adapted to be placed on said base member and to be removably secured thereto in any suitable manner, as by the provision of corner fastening screws 18 engaged through the corners of the transparent plate member 17 and threadedly engaged in the corners of the base member 13.

As will be presently explained, the second transparent member 17 is one of a number of different transparent members usuable with the base member 12, selected in accordance with the scale of the navigation chart on which the device is to be used.

The second transparent member 17 is provided with numerical values inscribed thereon along its top margin, said numerical values being located so as to be associated with the top ends of the time lines 15 on the base member 12, the bottom margin of the transparent member 17 being provided with similar numeral values located to be associated with the bottom ends of the time lines 15. The right side margin of the second transparent member 17 is provided with a series of ground speed values located so as to be associated with the right ends of the speed lines 14. The speed values are selected so as to be within the range of a particular type of aircraft on which the device is to be employed. The sloping time lines 15 represent the distances traversed at the various speeds on the speed scale for different times, as given by the numerical values at the top and bottom ends of the time lines, representing minutes of flight. These distance values are, of course, consistent with the scale of the chart on which the device is to be employed, the member 17 being selected, as above explained, in accordance with the scale of the chart. Thus, a series of members 17 may be provided which may be designed to match the scale of the Lambert conformable aeronautical chart with the scale 1 inch equals 500,000 inches, whereby a member 17 may be used to match charts with the scale of 1 inch equal to 250,000 inches merely by employing values in the time scale one-half those actually shown. Similarly a chart having a scale of one inch equals 1,000,000 inches may be matched by doubling the time scale of the above selected member 17. Other suitably calibrated members 17 may be employed to match charts having scales of 1 inch equals 2,000,000 inches, or other conventionally employed chart scales. Also, speed scales of many ranges such as 60 to 120 knots, as shown, or 120 to 240 knots, 240 to 480 knots, or speed ranges in between or in excess of these values may be provided on the calibration members 17.

The second transparent member 17 is formed with a longitudinal median slot 20 coextentive in length with and adapted to register with the slot 13 in the base member 12 when the second member 17 is attached thereto in the manner illustrated in FIGURES 1, 2 and 3.

Designated at 19 is a generally semi-circular transparent compass rose which is slidably and rotatably connected to the members 17 and 12 at the registering slots 20 and 13, as by a pivot bolt 21 extending through the slots and through the center point of the compass rose, being provided on its top portion with a clamping nut 22 adapted to clamp the compass rose in an adjusted position to the underlying members 17 and 12. As shown in FIGURES 1, 2 and 3, the compass rose may be positioned so that its center point coincides with the origin point of the members 17 and 12, namely, the right end portions of the registering slots 20 and 13.

The compass rose 19 is provided at the intermediate portion of its periphery with a radially extending arm or projection 23, the compass rose and arm 23 being inscribed with a radial center line 24 extending substantially from the center of the compass rose, said line 24 being provided with uniformly spaced markings therealong, defining a scale 25.

The compass rose is further inscribed with the uniformly spaced angle markings 27 on opposite sides of the center line 24, the markings being numbered, as shown, with angle values up to ninety degrees on opposite sides of the line 24.

The graduations 25 are not numbered, but are employed to facilitate the distance measurements, depending upon the size and the scale of the chart used in conjunction with the computer device 11.

The time-distance scale defined by the time lines 15 and the speed lines 14, in conjunction with the numerals associated therewith carried by the member 17 is used to determine from a pilotage check point an aircraft ground speed, from which the estimated time of arrival to other points along the route of the aircraft may be obtained. The drift angle scale, comprising the drift angle lines, 16 is employed to determine an aircraft's drift off course, the center line, defined by the superimposed slots 20 and 13 being placed along the intended track of the aircraft.

The compass rose 19 is employed to determine the angle necessary to converge on a point along the intended track after the drift angle is determined at a selected check point, as will be presently described. When the drift angle has been found at a selected check point, this provides the angle of correction necessary to return to a course parallel to the originally intended course. If the compass rose is then moved so that its vertex is located over an intended destination along the intended track of the aircraft and the compass rose is then rotated so that the center line 24 thereof extends through the check point an additional angular correction value is obtained from the compass rose, namely the angle of correction which must be added to the drift angle to provide the full correction necessary to cause the aircraft to converge on the selected point along the intended track of the aircraft.

The scale defined by the calibrations 25 is graduated so that it will show, in nautical miles in accordance with the scale of the chart on which it is employed, the distance required to fly to a desired point therealong, and in the above mentioned case, will indicate the distance required to fly to the intended destination from the check point.

The scale defined by the calibrations 25 may also be employed to measure distances to any point within its range.

In using the pilotage device 11, a speed scale within range of the particular type of aircraft under consideration and having a scale consistent with the type chart to be employed is selected. Thus, a suitable member 17 is selected whose speed scale is consistent with the aircraft on which the device is used and whose time scale is consistent with the chart on which the device is to be employed. The selected member 17 is attached to the base 12 by means of the screws 18, and the compass rose 19 is then attached to the members 12 and 17 by means of its fastening bolt 21 and securing nut 22. The center line of the device, defined by the registering slots 20 and 13 is then placed over the aircraft's intended course with the origin point, namely, the axis of bolt 21 with the compass rose located as in FIGURES 1, 2 and 3, over the point of departure, or last established fix. As the aircraft progresses on its flight, a check point or pilotage point may be identified. This point will appear on the chart beneath the computer. By noting the time lapse from the departure point, or known fix, to the identified check point, and by moving the device 11 vertically until the time line from this identified position intersects visually with the identified check point, a ground speed may be read directly from the base line, shown at 30. Thus, assuming that the identified check point appears at 31 in FIGURE 1, after an elapsed time of eight minutes, to determine the group speed, the device is moved vertically, namely, in the direction of the line 30, until the check point 31 on the chart appears directly beneath the eight minute time line. The ground speed may then be determined from the speed scale at the right end of the device by observing the speed value horizontally aligned with the point on the time line overlying the check point 31, which in this case will be approximately 100 knots.

With the ground speed established, time estimates to all points appearing beneath the computer can be obtained without requiring any difficult computations.

As above mentioned, the drift angle can be easily read by observing the location of the identified check point with respect to the center line defined by the slots 20 and 13, indicating the amount of drift of the aircraft on the intended course. The drift angle may be read directly from the lines 16. To get back on course, the compass rose 19 is adjusted until the vertex bolt 21 is located over the destination, or over a suitable check point along the intended track, and the compass rose is rotated so that the center line 24 thereof overlies the previously established pilotage check point. By then reading the angle value at the periphery of the compass rose which overlies the grooves 20 and 13, the necessary convergence angle is determined, which is added to the previously determined drift angle, giving the total angle necessary for correction to converge on the selected point along the intended track, namely, the point at which the vertex bolt 21 is located on the chart. By utilizing the drift angle thus observed, a necessary correction can be applied to maintain the course of the aircraft under the prevailing wind conditions after the aircraft has been placed back on its intended course.

Once the aircraft is back on its course, the device may be moved so that the base line 30 overlies the new fix, and the aircraft may proceed along the intended track with pilotage computations being made as long as reliable positions or fixes on the chart are available.

As will be readily understood, by use of the above device, all that is necessary for accurate navigation is a chart of fixed scale and an accurate watch or clock. No computers, plotters, or other apparatus is necessary to solve pilotage navigational problems, and all problems are visually solved and conclusions instantaneously obtained.

While a specific embodiment of an improved pilotage computer has been disclosed in the foregoing description, it will be understood that various modifications within the spirit of the invention may occur to those skilled in the art. Therefore it is intended that no limitations be placed on the invention except as defined by the scope of the appended claim.

What is claimed is:

A pilotage computer comprising a transparent base adapted to be placed on a chart, said base being inscribed with a series of drift angle lines diverging from a point on said base, a second transparent member detachably secured on said base, a generally semi-circular transparent compass rose, said base and second transparent member being formed with registering slots terminating substantially at the point of convergence of said drift angle lines, a vertical pivot bolt extending through said registering slots and through the center of said compass rose, slidably and rotatably connecting said compass rose at its center to said base and second transparent member at said registering slots for linear adjustment along said registering slots and for angular adjustment around its center, a clamping nut threaded on the top end of said pivot bolt for clamping the compass rose in adjusted position along said registering slots, and a transparent arm extending radially from the mid portion of the periphery of said compass rose, said compass rose and the arm being inscribed with a radial center line, said compass rose being provided with angle markings on opposite sides of said radial center line, said compass rose and arm being inscribed with uniformly spaced graduation markings along said radial line.

References Cited in the file of this patent

UNITED STATES PATENTS

| | | |
|---|---|---|
| 1,917,278 | Weems | July 11, 1933 |
| 2,425,097 | Isom | Aug. 5, 1947 |
| 2,495,777 | Schroeder | Jan. 31, 1950 |
| 2,545,935 | Warner | Mar. 20, 1951 |
| 2,961,156 | Carter et al. | Nov. 22, 1960 |

FOREIGN PATENTS

| | | |
|---|---|---|
| 56,954 | France | July 30, 1952 |
| 468,359 | France | Apr. 22, 1914 |
| 727,851 | France | June 25, 1932 |
| 738,871 | France | Dec. 30, 1932 |
| 1,033,321 | France | July 9, 1953 |
| 1,090,442 | France | Oct. 20, 1954 |
| 69,573 | Germany | Oct. 16, 1892 |
| 183,347 | Great Britain | July 27, 1922 |
| 691,351 | Great Britain | May 13, 1953 |